United States Patent Office 3,850,842
Patented Nov. 26, 1974

3,850,842
POLYMERIZATION CATALYSTS
Paolo Longi, Umberto Giannini, and Romano Mazzocchi, Milan, Italy, assignors to Montecatini Edison S.p.A., Milan, Italy
No Drawing. Continuation of abandoned application Ser. No. 53,022, July 7, 1970. This application Aug. 30, 1972, Ser. No. 284,712
Claims priority, application Italy, July 8, 1969, 19,319/69
Int. Cl. B01j 11/84
U.S. Cl. 252—429 C
18 Claims

ABSTRACT OF THE DISCLOSURE

New polymerization catalysts, more particularly catalysts for the polymerization of ethylene and mixtures thereof with higher alpha-olefins and/or diolefins are disclosed.

The catalysts are prepared by mixing a hydride or organometallic compound of a metal belonging to Groups I to III of the Mendelyeev Periodic Table with the product obtained by contacting (A) a titanium compound of the formula $$M_2TiX_{n+2}$$

in which M is an alkaline metal, the substituents $X_n$ are halogen atoms, and $n$ is the valence of the titanium, e.g., disodium titanium hexachloride, with (B) a support comprising an anhydrous magnesium halide which is either in preactivated state or activated under the conditions prevailing when it is contacted with the Ti compound.

---

This is a continuation of application Ser. No. 53,022, filed July 7, 1970, now abandoned.

THE PRIOR ART

Various catalysts have been proposed for polymerizing ethylene and mixtures thereof with higher alpha-olefins and/or diolefins; one of the most important of such catalysts has been prepared from organometallic compounds of metals belonging to Groups I to III of the Mendelyeev Periodic Table and transition metal compounds such as titanium and vanadium halides.

Also, our group has disclosed improved catalysts for the polymerization of ethylene and mixtures thereof with higher alpha-olefins and/or diolefins which catalysts were prepared by mixing hydrides and organometallic compounds of the Groups I to III metals with products obtained by contacting various titanium or vanadium compounds with supports comprising anhydrous magnesium or zinc halides in preactivated state or under conditions resulting in activation of the support.

THE PRESENT INVENTION

One object of this invention was to provide new and alternative catalysts for the polymerization of ethylene and mixtures thereof with higher alpha-olefins and/or diolefins.

This and other objects are accomplished by the invention in accordance with which new catalysts are prepared by mixing hydrides or organometallic compounds of the Groups I to III metals with the product obtained by contacting (A) a titanium compound of the formula $$M_2TiX_{n+2}$$

as defined in the abstract with (B) a support comprising an anhydrous magnesium halide, more particularly $$MgCl_2 \text{ or } MgBr_2$$

which has been preactivated or which is activated by the conditions under which it is contacted with the Ti compound.

Titanium compounds which are useful in preparing these new polymerization catalysts include $$Na_2TiCl_6; K_2TiCl_6; K_2TiBr_6; \text{ and } Na_2TiCl_4$$

The active anhydrous magnesium halide comprising the support used in preparing these new polymerization catalysts has two characteristics as follows:

(1) in its X-ray spectrum the intensity of the reflection which is most intense in the spectrum of the normal (inactive) magnesium halide is markedly decreased; and (2) it has a specific surface area higher than 3 m.$^2$/g., and preferably higher than 15 m.$^2$/g.

In the case of anhydrous $MgCl_2$, the active form used in preparing the present catalysts is characterized in that, in its X-ray spectrum, the reflection at $d=2.56$ A. (which has the highest intensity in the spectrum of normal $MgCl_2$) is markedly decreased in intensity and there appears a diffused halo which is localized over the range $d=2.56$ to 2.95 A.; and its surface area is greater than 9 m.$^2$/g.

The useful active form of $MgBr_2$ is characterized in that, in its X-ray spectrum, the reflection at $d=2.93$ A. (which is the most intense reflection in the X-ray spectrum of the normal $MgBr_2$) is markedly less intense and there appears a diffused halo which is localized over the range $d=2.80$ to 3.25 A.; and its surface area is greater than 9 m.$^2$/g.

The supported catalyst component can be prepared in various ways. According to a presently preferred method, it is prepared by cogrinding the Ti compound and anhydrous magnesium halide for grinding times and under conditions such that the magnesium halide is converted to the active form having the characteristics stipulated hereinabove.

The grinding is preferably carried out in a ball mill, and operating in the dry state, that is, in the absence of inert liquid diluents.

The supported catalyst-forming component can also be prepared by simply mixing the Ti compound and a reactivated anhydrous magnesium halide together in the solid state. However, in that case, the Ti compound and support are used, preferably, in suspension in an inert solvent.

The anhydrous magnesium halide can be obtained in the active form by grinding or by methods other than grinding.

One such method consists in decomposing compounds of the formula RMgX, in which R is a hydrocarbon radical and X is halogen by known methods, or by treatment with halogenated compounds such as anhydrous gaseous hydrochloric acid.

Another method of obtaining the active anhydrous magnesium halide involves the thermal decomposition, under reduced pressure, of addition compounds of anhydrous Mg halides with Lewis bases or acids, or decomposition of Mg halides in the form of compounds containing organic crystallization solvents. For instance, active $MgCl_2$ is obtained by this method, starting from its solution in ethanol.

The amount of Ti compound used in preparing the supported catalyst-forming component may vary over a wide range, from 0.01% by weight, with respect to the support, to 30% or more by weight.

Hydrides and organometallic compounds of the Groups I to III metals which can be used in preparing the present catalysts include $$Al(C_2H_5)_3, Al(C_2H_5)_2Cl, Al(iC_4H_9)_3, Al(iC_4H_9)_2Cl,$$

$$Al_2(C_2H_5)_3Cl_3, Al(C_2H_5)_2H, Al(iC_4H_9)_2H,$$

$$Al(C_2H_5)_2Br \; LiAl(iC_4H_9)_4 \text{ and } LiiC_4H_9.$$

The molar ratio between the hydride or organometallic compound and the Ti compound is not critical. When the catalyst is to be used for polymerizing ethylene, said ratio is preferably between 50 and 1000.

The catalysts are used to polymerize or copolymerize olefins in accordance with known techniques, that is, in the liquid phase in the presence or absence of an inert solvent, or in gaseous phase.

The polymerization temperature can vary widely from −80° C. to 200° C. Preferably the temperature is between 50° C. and 100° C., and the polymerization is carried out at atmospheric pressure or under increased pressure.

Regulation of the molecular weight of the polymer during the polymerization reaction can be effected by known expedients, such as by operating in the presence of alkyl halides, organometallic compounds of Zn or Cd, or hydrogen.

As is known, the activity of the normal so-called "Ziegler-type" catalysts prepared from transition metal compounds and organometallic compounds of the Group I to III metals is considerably reduced by the presence in the polymerization system of hydrogen or other chain-transfer agents used to regulate the molecular weight.

In contrast, using the catalysts according to this invention, it is possible to regulate the molecular weight of the polymer formed to low, and even very low values, without any appreciable decrease in the activity of the catalysts by the molecular weight regulating agents. This is an additional, important advantage of the present catalysts.

In polymerizing ethylene, for example, in contact with these catalysts, it is possible to adjust the molecular weight of the polyethylene, by inclusion of a molecular weight regulating agent in the system, to a value in a range of practically useful values corresponding to intrinsic viscosities (in Tetralin at 135° C.) of from about 1 to 3 dl./g., without the polymer yield, based on active catalyst used, falling to a value below which it would be necessary to purify the polymer of catalyst residues, on completion of the polymerization reaction.

The polyethylene obtained with the aid of these new catalysts is a substantially linear polymer, highly crystalline, and has a specific gravity of 0.96 g./cc. or higher. The processing characteristics of the polyethylene are better, in general, than those of the polyethylene obtained with the so-called "Ziegler" catalysts. The Ti content of the polyethylene, without purification of the polymer, is generally, lower than 10 p.p.m.

The following examples are given to illustrate the invention, and are not intended to be limiting. Unless otherwise stated, the percentages given in the examples are by weight. The intrinsic viscosities reported in the examples were measured in Tetralin at 135° C., unless otherwise stated.

EXAMPLE 1

0.3 g. of $K_2TiCl_6$ (prepared from $TiCl_4$ and KCl according to the method described by K. F. Guenther, Inorg. Chem., 3, 923—1964) and 9.8 g. of $MgCl_2$ anhydrous are ground, in a nitrogen atmosphere, for 16 hours in a glass mill (length 100 mm., diameter 50 mm.) containing 550 g. of steel balls having a diameter of 9.5 mm.

0.04 g. of the ground mixture, 2 cc. of $Al(iC_4H_9)_3$ and 1000 cc. of anhydrous n-heptane are introduced, in a nitrogen atmosphere, into a 3-liter stainless steel autoclave provided with a stirrer of the anchor type and heated to a temperature of 80° C. Ethylene (10 atm.) and hydrogen (5 atm.) are added and the pressure (15 atm.) is maintained for the duration of the polymerization by introducing ethylene continuously.

After 8 hours polymerization is interrupted and the polymer obtained is filtered and dried.

133 g. of granular polyethylene is obtained, having a bulk density of 0.35 g./cc. and an intrinsic viscosity, determined in tetrahydronaphthalene at 135° C., of 2.3 dl./g.

The yield in polymer is 78,000 g./g. Ti employed.

EXAMPLE 2

Example 1 is repeated, except that the supported catalyst-forming component is prepared by grinding 0.33 g. of $K_2TiCl_6$ and 10.02 g. of $MgCl_2$ for 24 hours. Employing 0.363 g. of this mixture and polymerizing ethylene in the manner described in Example 1, 154 g. of polyethylene are obtained, having a bulk density of 0.32 g./cc. and an intrinsic viscosity of 2.3 dl./g.

The polymer yield is 91,200 g./g. Ti.

EXAMPLE 3

In this case, the mixture obtained by grinding 1.08 g. of $Na_2TiCl_6$ [obtained according to the method previously indicated for $K_2TiCl_6$; Ti found=15.38% (calculated=15.62%); Cl found=68.95% (calculated =69.38%)] and 7.35 g. of anhydrous $MgCl_2$. Using 0.147 g. of this mixture and proceeding according to Example 1, 194 g. of polyethylene are obtained. The polyethylene has an intrinsic viscosity of 2.5 dl./g. The polymer is 67,000 g./g. Ti.

Although the second catalyst-forming component used in preparing the catalysts shown in the examples was $Al(iC_4H_9)_3$, equivalent results are obtained when the $Al(C_2H_5)_2Br$, $LiAl(iC_4H_9)_4$ and $LiiC_4H_9$.

$Al(iC_4H_9)_3$ is replaced by hydrides or other organometallic compounds of aluminum as disclosed herein.

As will be apparent, various changes may be made in details in practicing the invention without departing from its spirit. We intend to include, in the scope of the appended claims, all modifications which will be obvious to those skilled in the art from the description and working examples given herein.

What is claimed is:

1. A catalyst for the polymerization of olefins and consisting essentially of the product by mixing
   (a) a catalyst-forming component which is selected from the group consisting of $Al(C_2H_5)_3$, $Al(C_2H_5)_2Cl$, $Al(iC_4H_9)_3$, $Al(iC_4H_9)_2Cl$, $Al_2(C_2H_5)_3Cl_3$, $Al(C_2H_5)_2H$, $Al(iC_4H_9)_2H$, $Al(C_2H_5)_2Br$, $LiAl(iC_4H_9)_4$ and $LiiC_4H_9$, with (b) a catalyst-forming component obtained by contacting (1) a titanium compound having the general formula $$M_2TiX_{n+2}$$

in which M is an alkali metal, the substituents $X_n$ are halogen atoms and $n$ is the valence of the titanium, with (2) a support consisting of an active anhydrous magnesium dihalide characterized in that, in its X-rays spectrum, the reflection which is most intense in the X-rays spectrum of the normal, inactive magnesium dihalide is markedly decreased in intensity, and in that it has a surface area greater than 3 m.²/g.

2. A catalyst according to Claim 1, characterized in that the Ti compound is selected from the group consisting of $K_2TiCl_6$; $Na_2TiCl_6$; $K_2TiBr_6$ and $Na_2TiCl_4$.

3. A catalyst according to Claim 1, characterized in that catalyst-forming component (b) is obtained by co-grinding the Ti compound and anhydrous magnesium dihalide.

4. A catalyst according to Claim 1, characterized in that the active magnesium dihalide is active $MgCl_2$.

5. A catalyst according to Claim 1, characterized in that the active magnesium dihalide is active $MgBr_2$.

6. The method of preparing catalysts for the polymerization of olefins which consists in contacting a titanium compound having the general formula $$M_2TiX_{n+2}$$

in which M is an alkali metal the X substituents are halogen atoms, and $n$ is the valence of the titanium with an active anhydrous magnesium dihalide characterized in that, in its X-rays spectrum, the reflection which is most intense in the X-rays spectrum of the normal, inactive magnesium dihalide is markedly decreased in intensity, and in that it has a surface area greater than 3 m.²/g., and mixing the product thus obtained with a substance selected from the group consisting of $Al(C_2H_5)_3$, $Al(C_2H_5)_2Cl$, $Al(iC_4H_9)_3$, $Al(iC_4H_9)_2Cl$, $Al_2(C_2H_5)_3Cl_3$, $Al(C_2H_5)_2H$, $Al(iC_4H_9)_2H$, $Al(C_2H_5)_2Br$, $LiAl(iC_4H_9)_4$ and $LiiC_4H_9$.

7. The method of Claim 6, in which the Ti compound is selected from the group consisting of $K_2TiCl_6$; $Na_2TiCl_6$; $K_2TiBr_6$ and $Na_2TiCl_4$.

8. The method of Claim 6, in which the Ti compound is co-ground with an anhydrous magnesium dihalide.

9. The method of Claim 6, in which the active magnesium dihalide is active $MgCl_2$.

10. The method of Claim 6, in which the active magnesium is active $MgBr_2$.

11. A catalyst according to Claim 1, in which the magnesium dihalide is preactivated.

12. A catalyst according to Claim 1, in which the magnesium dihalide is preactivated $MgCl_2$.

13. A catalyst according to Claim 1, in which the magnesium dihalide is preactivated $MgBr_2$.

14. The process of Claim 6, in which the magnesium dihalide is preactivated.

15. The process of Claim 6, in which the magnesium dihalide is preactivated $MgCl_2$.

16. The process of Claim 6, in which the magnesium dihalide is preactivated $MgBr_2$.

17. A catalyst according to Claim 1, in which the magnesium dihalide is preactivated by grinding.

18. The process of claim 6, in which the magnesium dihalide is preactivated by grinding.

References Cited
UNITED STATES PATENTS

| | | | |
|---|---|---|---|
| 3,143,537 | 8/1964 | Hagemeyer et al. | 252—429 C X |
| 3,496,252 | 2/1970 | Kato et al. | 252—429 C X |
| 3,035,035 | 5/1962 | Mensikova et al. | 252—429 C X |

PATRICK P. GARVIN, Primary Examiner

U.S. Cl. X.R.

260—94.9 E, 88.2 B, 85.3 R